US005680493A

United States Patent [19]

Naitoh

[11] Patent Number: 5,680,493

[45] Date of Patent: Oct. 21, 1997

[54] OPTICAL COUPLER

[75] Inventor: Katsuyoshi Naitoh, Tokyo, Japan

[73] Assignee: Oki Electric Industry Co., Ltd., Tokyo, Japan

[21] Appl. No.: 660,107

[22] Filed: Jun. 7, 1996

[30] Foreign Application Priority Data

Jun. 13, 1995 [JP] Japan .................................... 7-146116

[51] Int. Cl.[6] ........................................ G02B 6/36

[52] U.S. Cl. .................................. 385/51; 385/38; 385/80

[58] Field of Search .................................. 385/38, 60–68, 385/78–85

[56] References Cited

U.S. PATENT DOCUMENTS 4,902,095 2/1990 Baker et al. ........................ 350/96.21

4,919,510 4/1990 Hoke et al. ........................ 350/96.21

5,018,821 5/1991 Kurata .................................. 350/96.2

5,251,276 10/1993 Berkey et al. ........................ 385/43

*Primary Examiner*—John Ngo

*Attorney, Agent, or Firm*—Spencer & Frank

[57] ABSTRACT

An optical fiber which has an end surface E is inserted into a ferrule, then the end surface E is allocated into a hollow of the ferrule.

After the optical fiber and the ferrules are united, the hollow is filled with ultraviolet ray setting resin whose refractive index is matched with the optical fiber.

Then, the hollow is covered with a quartz glass, and ultraviolet ray is irradiated to ultraviolet ray setting resin through the quartz glass. So, the optical fiber, the ferrule, the ultraviolet ray setting resin and the quartz glass are unified.

16 Claims, 5 Drawing Sheets

PD 25
LD 21
LENS 22
B
FIRST OPTICAL FIBER 23A
5
C
TRANSPARENT FERRULE 24
SECOND OPTICAL FIBER 23
A
BASE 26
5

4
24
23
26
4

23A
22
UV
5
G
23
24
25
21
Y
X
Z
H
23A
D
F
26
E
5

OPTICAL COUPLER

FIELD OF THE INVENTION

The invention relates to a structure and method of manufacturing an optical coupler used for optical communication.

BACKGROUND OF THE INVENTION

An LD module which has a semiconductor laser (hereinafter, LD) is typically used as a light source for optical communication.

This type of LD module must be small. As a result, the LD module is being changed to a flat form from a cylindrical form.

FIG. 1 shows a cross-sectional view of a conventional flat form LD module, FIG. 2 shows a side view of the flat form LD module, and FIG. 3 is a diagram showing a way of reconstructing the flat form LD module.

Next, the conventional flat form LD module is explained. In FIG. 1, the conventional flat form LD module has a LD 1, a lens 2 for focusing a signal light from the LD 1, an optical fiber 3 which is connected with an outside optical fiber, a ferrule 4 which is made of zirconia ceramics to hold the optical fiber 3, a photo diode (hereinafter, PD) 5 for monitoring the LD 1 and a base 6 to unify the LD 1, the lens 2, optical fiber 3, the ferrule 4, and to the PD 5.

The flat form LD module is assembled as shown in FIG. 3.

First, the optical fiber 3 which is unified with the ferrule 4 is put on the base 6 and fixed at the D section and the E section by adhesion or metal fixing. Then, after the lens 2 has been adjusted along the XYZ-axes to the LD 1 and the optical fiber 3, it is fixed by an adhesive at the F section.

SUMMARY OF THE INVENTION

An object of the present invention is to realize an optical coupling in a simple manufacturing process.

In one aspect of the invention, an optical coupler comprises: a ferrule which has a hollow; an optical fiber which has an end surface and the end surface is allocated into the hollow; refractive index matching material which is filled into the hollow; and a transparent cover for covering the hollow.

In another aspect of the invention, an optical coupler comprises: a first optical fiber; a second optical fiber; a transparent ferrule for holding the first optical fiber and the second optical fiber; and the first optical fiber is connected with the second optical fiber in the transparent ferrule by an ultraviolet ray setting resin.

DETAILED DESCRIPTION OF THE PREFERRED EMBODIMENTS (A) A First Embodiment

Figure 1:
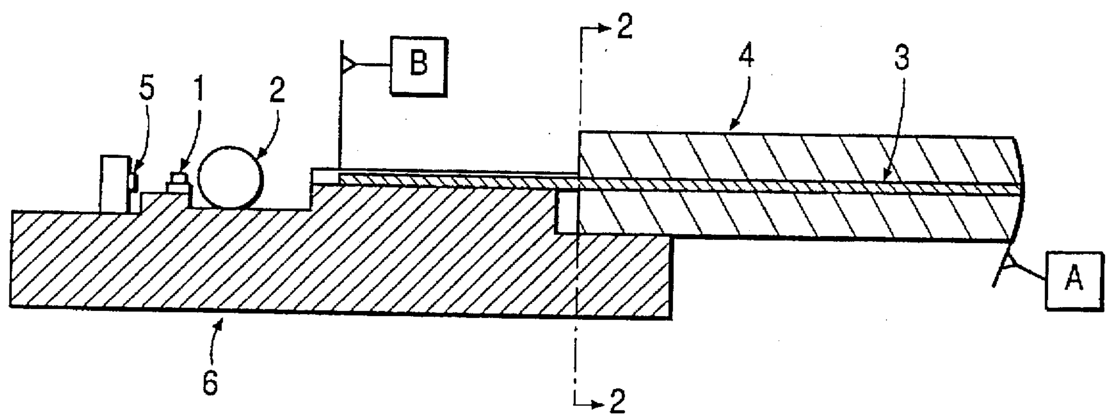
FIG. 1 shows a cross-sectional view of a conventional flat form LD module.
Figure 2:
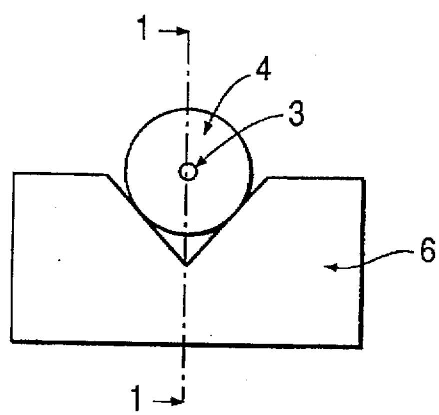
FIG. 2 shows a side view of the flat form LD module.
Figure 3:
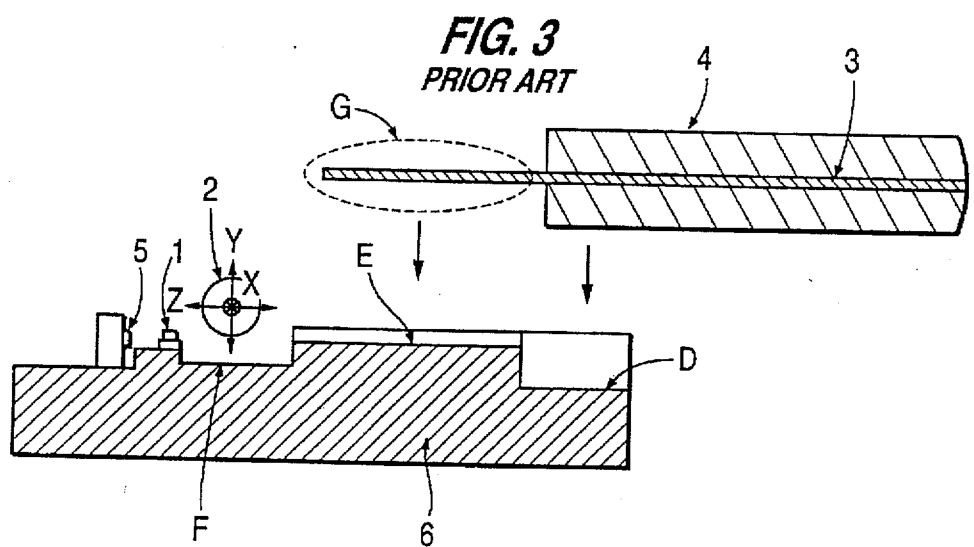
FIG. 3 is a diagram showing a way of constructing the flat form LD module.
Figure 4:
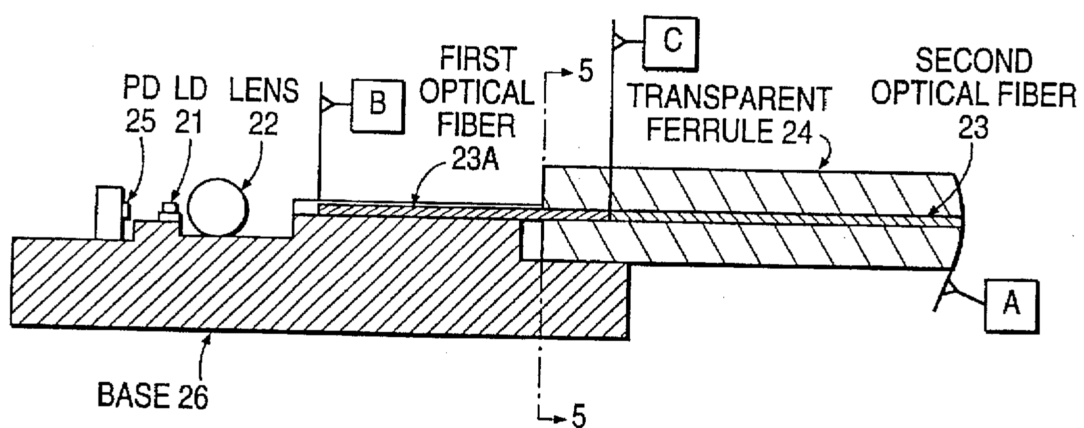
FIG. 4 shows a cross-sectional view of a flat form LD module.
Figure 5:
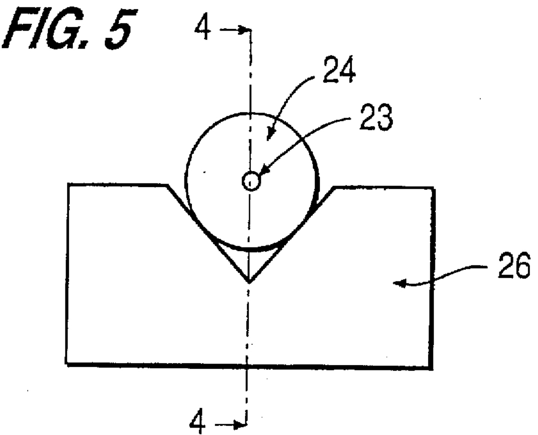
FIG. 5 shows a side view of the flat form LD module.
Figure 6:
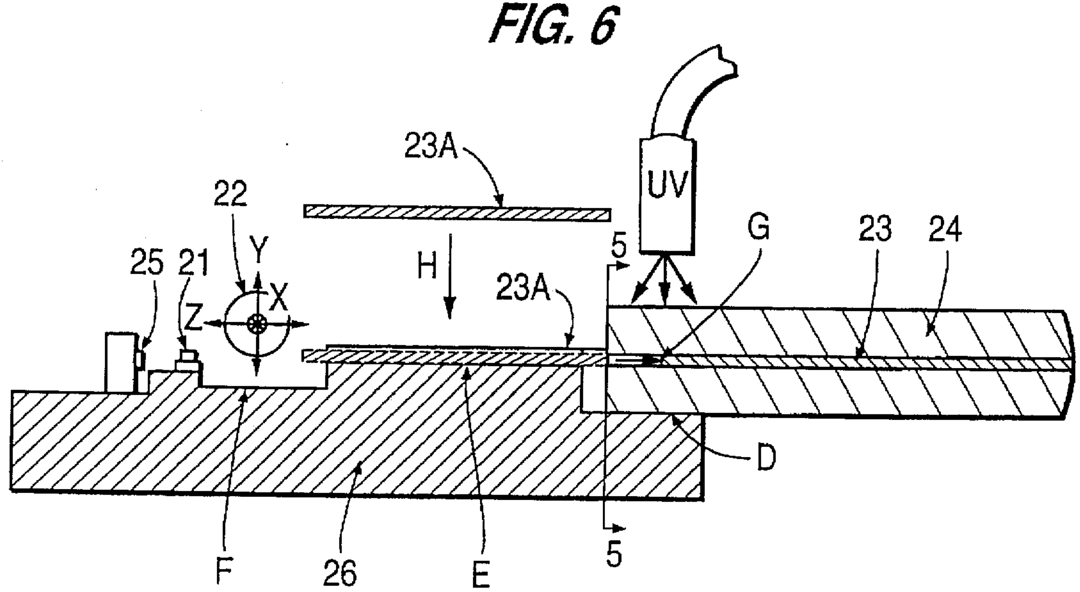
FIG. 6 is a diagram showing a way of constructing the flat form LD module.

FIGS. 4, 5 and 6 are diagrams showing a first embodiment of the invention FIG. 4 shows a cross-sectional view of a flat form LD module taken along a line 5—5 of FIG. 5.

FIG. 5 is a side view of the flat form LD module, and FIG. 6 shows a diagram showing a way of constructing the flat form LD module.

Referring to FIG. 4, the flat form LD module has a LD 21, a lens 22 for focusing a signal light from the LD 21, a first optical fiber 23A, a second optical fiber 23 which is connected with the first optical fiber 23A, a transparent ferrule 24 for holding the optical fibers 23 and 23A, a PD 25 and a base 26. Surface B and surface C of the optical fibers 23A and 23 are polished to flat mirror surfaces. The transparent ferrule 24 is made of quartz and fixes the second optical fiber 23 by the use of epoxy resins. Surface A is polished to a bulb-surface.

FIG. 6 explains a way of constructing the flat form LD module which is as follows. First, the LD 21 and the PD 25 are bonded to the base 26 by soldering. Then, the transparent ferrule 24, which holds the second optical fiber 23, is fixed to section D of the base 26 by adhesion or soldering.

Second, the first optical fiber 23A to which is applied an ultraviolet ray setting resin is allocated to the base 26 in the direction of arrow H. After the first optical fiber 23A is inserted into the transparent ferrule 24 and is contacted with surface G of the second optical fiber 23, an ultraviolet ray is irradiated from an upper part of the aperture for unifying the first optical fiber 23A and the second optical fiber 23. After the optical fibers 23A and 23 are unified, the first optical fiber 23A is fixed to section E on the base 26 by adhesion or soldering.

And then, after the lens 22 is adjusted along the XYZ-axes to the first optical fiber 23A and the LD 21, the lens 22 is fixed on section F of the base 26 by adhesion or soldering. In this way, construction of the flat form LD module which has an optical coupler is completed.

According to the first embodiment, an optical fiber for optical coupling is separated into the first optical fiber 23A for connecting with the inside and the second optical fiber 23 for connecting with the outside. Then, they are unified in a last step which fixes the optical fibers to the base. As a result, handling of the optical fibers is easy.

Moreover, since a connector of the LD module can be standardized, the cost of the parts for the LD module can be reduced.

(B) A Second Embodiment

Figure 7:
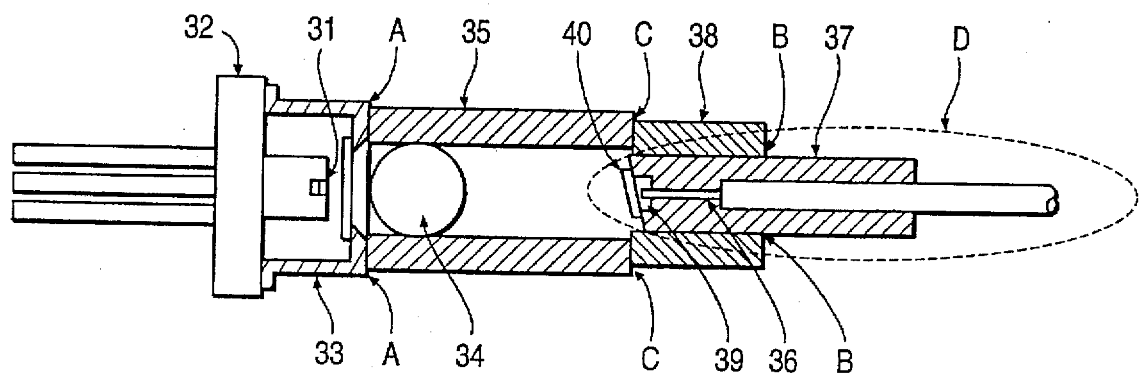
FIG. 7 shows a cross-sectional view of a LD module.
Figure 8:
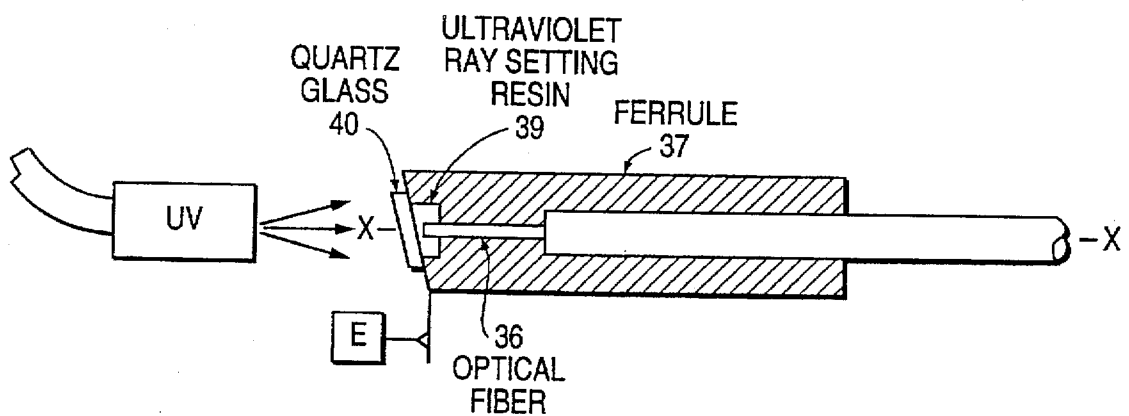
FIG. 8 is a diagram showing a constructing way of a pig tail.
Figure 9:
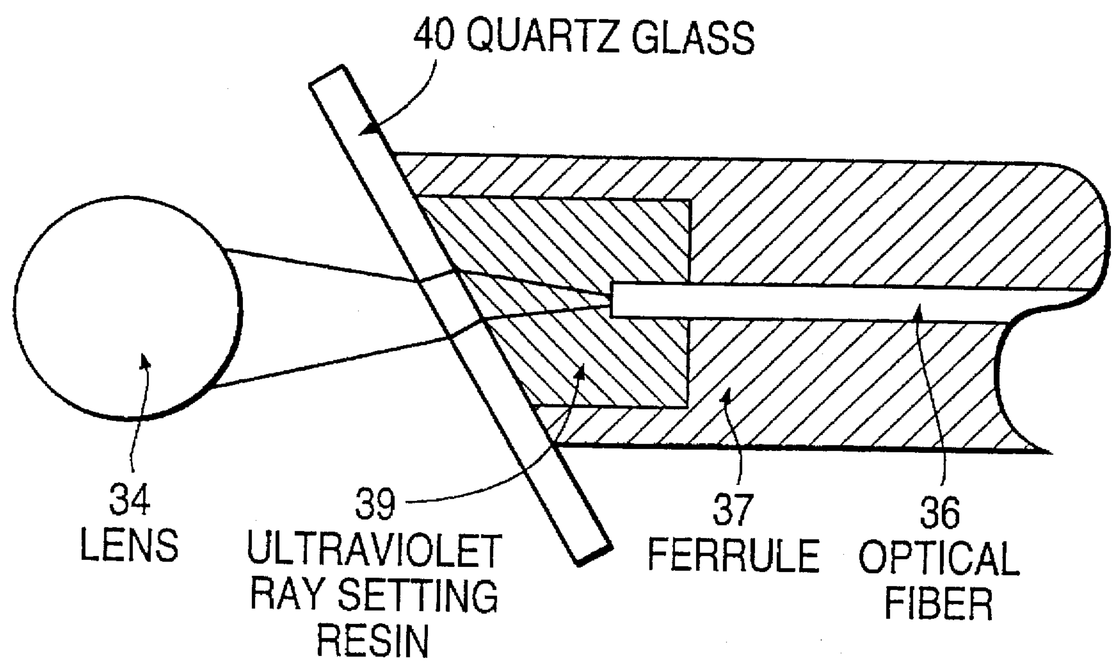
FIG. 9 is a diagram showing functions of a reflective surface of the pig tail.

FIGS. 7, 8 and 9 are diagrams showing a second embodiment of the invention.

FIG. 7 shows a cross-sectional view of a LD module.

Referring to FIG. 7, the LD module has a LD 31, a small size CD head 32 for mounting the LD 31, an airtight seal cap 33 for preventing oxidization of the LD 31 and which has a window for outputting a signal light from the LD 31, a lens 34 for focusing the signal light from the LD 31, and a lens holder 35 for holding the lens 34 by forcing or welding. The lens holder 35 is fixed to the airtight seal cap 33 by spot welding, such as YAG welding.

The lens holder 35 has two functions. One function is for aligning the lens 34 with a light axis direction of the LD 31. The other function is for fixing an optical fiber 36 on a focal position of the lens 34.

Furthermore, the LD module has a ferrule 37 which has a hollow region at an end portion or surface, a sleeve 38 for holding the ferrule 37, a quartz glass 40 which is secured on the end portion or surface of the ferrule 37, and ultraviolet ray setting resin 39 which is filled into the hollow region of the ferrule 37. The end surface of the ferrule 37 is arranged diagonally to an axis of the signal light. The ultraviolet ray setting rein 39 has the same refractive index as that of the optical fiber 36.

Part A, B and C are fixed after alignment of the axis of the signal light is finished, and hereinafter, part D of the LD module is called a "pig tail".

FIG. 8 is a diagram showing a of way of constructing the pig tail.

First, the optical fiber 36, which has an end surface E, is inserted into an aperture extending along the longitudinal axis of X—X of the ferrule 37, such that the end surface E is projecting into the hollow of the ferrule 37. Because end surface E of the fiber is cut by stress fracture, the end surface E.

After the optical fiber 36 and the ferrule 37 are untied, the hollow is filled with the ultraviolet ray setting resin 39, which has a refractive index matched to that of the optical fiber 36.

Then, the hollow is covered with the quartz glass 40, and an ultraviolet ray is irradiated on the ultraviolet ray setting resin 39 through the quartz glass 40 to set the ultraviolet ray setting resin. So, the optical fiber 36, the ferrule 37, the ultraviolet ray setting resin 39 and the quartz glass 40 are unified as the pig tail.

FIG. 9 is a diagram showing the functions of a reflective surface of the pig tail. The signal light output from the lens 34 permeates the quartz glass 40 and the ultraviolet ray setting resin 39, and is focused on the flat surface of the optical fiber 36.

Because the refractive index of the ultraviolet ray setting resin 39 is matched with that of the optical fiber 36, the flat surface of the optical fiber 36 does not reflect the signal light from the lens 34.

Furthermore, the reflective surface of the quartz glass 40 is inclined substantially. Hence, the quartz glass 40 functions in the same manner as an optical fiber whose surface is polished diagonally to a light axis.

Thus, according to the second embodiment, a step for polishing the surface of an optical fiber diagonally to the light axis is not needed. As a result, the reflective surface can be made by a simple manufacturing process.

Moreover, the hollow of the ferrule 37 is filled with an ultraviolet ray setting resin which functions as a refractive index matching material. Instead of the ultraviolet ray setting resin, other material, such as glycerine, can be used as the refractive index matching material.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical coupler comprising:

a ferrule having an end portion and a longitudinal axis, the end portion of said ferrule being transverse to said longitudinal axis and having a hollow region therein;

an optical fiber located within said ferrule and extending along the longitudinal axis thereof, said optical fiber projecting into the hollow region at the end portion of said ferrule;

a refractive index matching material located within said hollow region; and a transparent member located on the end portion of said ferrule, said transparent member covering said hollow region.

2. The optical coupler according to claim 1, wherein the refractive index matching material is ultraviolet ray setting resin.

3. The optical coupler according to claim 1, wherein the refractive index matching material is glycerine.

4. An optical coupler according to claim 1, wherein said ferrule has an aperture extending along the longitudinal axis of said ferrule, said optical fiber being positioned within said aperture.

5. An optical coupler according to claim 1, wherein the end portion of said ferrule is oblique to the longitudinal axis of said ferrule.

6. An optical coupler according to claim 1, wherein said transparent member is located on the end portion of said ferrule at an oblique angle to the longitudinal axis of said ferrule.

7. An optical coupler according to claim 1, wherein said refractive index matching material has a first refractive index, said optical fiber has a second refractive index, and wherein said first refractive index matches said second refractive index.

8. An optical coupler according to claim 1, wherein said transparent member is secured to the end portion of said ferrule.

9. A method of manufacturing an optical coupler comprising:

locating an optical fiber within a ferrule having an end portion and a longitudinal axis, the end portion of said ferrule being transverse to said longitudinal axis and having a hollow region therein, said optical fiber extending along the longitudinal axis of said ferrule and projecting into the hollow region at the end portion of said ferrule;

locating refractive index matching material within said hollow region; and locating a transparent member on the end portion of said ferrule, said transparent member covering said hollow region.

10. The method of manufacturing an optical coupler according to claim 9, wherein said refractive index matching material is ultraviolet ray setting resin.

11. A method of manufacturing an optical coupler according to claim 9, wherein said ferrule further comprises an aperture extending along the longitudinal axis of said ferrule; and said step of locating the optical fiber comprises positioning said optical fiber into said aperture.

12. A method of manufacturing an optical coupler according to claim 9, wherein said step of locating refractive index matching material comprises filling said hollow region with refractive index matching material.

13. A method of manufacturing an optical coupler according to claim 9, further comprising the step of setting said refractive index matching material.

14. A method of manufacturing an optical coupler according to claim 13, wherein said refractive index matching material is an ultraviolet ray setting resin, and wherein said step of setting said refractive index matching material comprises irradiating said ultraviolet ray setting resin with an ultraviolet ray.

15. A method of manufacturing an optical coupler according to claim 9, further comprising the step of coupling said optical fiber and said transparent member with said refractive index matching material.

16. A method of manufacturing an optical coupler according to claim 9, further comprising the step of securing said transparent member to the end portion of said ferrule.

* * * * *